(12) United States Patent
Nuthakki et al.

(10) Patent No.: US 8,131,608 B2
(45) Date of Patent: Mar. 6, 2012

(54) LOCALIZING REPORTS USING METADATA AND MULTILANGUAGE TRANSLATIONS

(75) Inventors: Manoj Nuthakki, Redmond, WA (US); Karthik Ravindran, Bellevue, WA (US); Samuel H. Skrivan, Seattle, WA (US); John G. Stairs, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 11/787,033

(22) Filed: Apr. 13, 2007

(65) Prior Publication Data

US 2008/0256096 A1  Oct. 16, 2008

(51) Int. Cl.
*G07B 17/00* (2006.01)

(52) U.S. Cl. ............. 705/30; 705/35; 705/38; 705/42; 707/807; 709/203; 235/379; 235/380; 235/440

(58) Field of Classification Search .............. 705/30, 705/35, 38, 42; 707/807; 709/203; 235/379, 235/440, 380
See application file for complete search history.

(56) References Cited

U.S. PATENT DOCUMENTS 6,831,668 B2 * 12/2004 Cras et al. ............. 715/853
7,194,413 B2 * 3/2007 Mahoney et al. ......... 704/277
2006/0005127 A1 * 1/2006 Ferguson et al. ......... 715/522
2007/0255574 A1 * 11/2007 Polo-Malouvier et al. ...... 705/1
2008/0147720 A1 * 6/2008 Allerton et al. .......... 707/103 R

OTHER PUBLICATIONS

Web pages from www.devconnections.com/shows/sqlspring2006/default.asp?c=1&s=75, *Microsoft Day SQL Server*, Copyright 2001-2005, Penton Media, pp. 1-7.
Larson, Brian, *Buliding a Localized Report on a SQL Server 2005 Analysis Service Cube Data Source*, Aug. 2006, pp. 1-20.
Chaffin, Mark, et al., *Managing Metadata in SQL Servier 2005*, Mar. 15, 2006, pp. 1-32.
Payne, Alex, et al., *SQL Server 2005 Reporting Services (SSRS)*, May 1, 2005, pp. 1-15.

* cited by examiner

*Primary Examiner* — Don Wong
*Assistant Examiner* — Tuan-Khanh Phan
(74) *Attorney, Agent, or Firm* — Joseph R. Kelly; Westman, Champlin & Kelly, P.A.

(57) ABSTRACT

A method of developing a report capable of providing information from a local database in a predefined structure to a remote application is discussed. The method includes defining an abstract data report structure. The abstract data report structure is configured to provide a report to the remote application having a plurality of data elements. The method further includes localizing at least one of the plurality of data elements by assigning it a remotely customizable field value; and exposing the abstract data report structure to the remote application.

15 Claims, 8 Drawing Sheets

| checknum.value | 12543 |
| --- | --- |
| payorname.Value | XYZ Company |
| payoraddress.Value | 123 Elm Street<br>Anytown, USA |
| recipientname.Value | ABC Company |
| recipientaddress.Value | 789 Main Street<br>Central City, USA |
| amounttext.Value | Five Hundred Fifty and 00/100 |
| amt.value | $555.00 |
| bankname.Value | Anytown State Bank |
| bankaddress.Value | 10987 Division Avenue<br>Anytown, USA |
| reason.Value | Purchase Order #12345 |

| PTO | Pay to the Order of |
| --- | --- |
| For | For |

| PTO | Salaire à l'ordre de |
| --- | --- |
| For | Pour |

*FIG. 7B*

LOCALIZING REPORTS USING METADATA AND MULTILANGUAGE TRANSLATIONS

BACKGROUND

Data stores such as databases can be used to store data for a wide variety of applications. Part of the utility of data stores are the many ways that stored data can be accessed to create data reports, which allow a person to visualize information stored in a particular data store in a way that is meaningful for the person. For example, information stored in a database about individual sales for a business can be collected into a sales report in any number of ways. In many applications a report definition is created using a report definition language that determines what information is provided in a particular report. In addition, the report definition can include information as to the form in which the information is presented in the report.

In some cases, it may be desirable to provide the same report to different remote locations. This may be true in situations where, for example, an organization has operations at multiple sites. In addition, it is possible that different sites will require that the report have certain localized customizations. For example, a sales report may be sent to a first site in an organization located in a first country that desires to see the information printed in a first language. A second site may receive the same report in second country in which a second language is spoken. People at the second site would therefore prefer that the report be provided in a second language. Reports can include other differences from one location to the next. For example, a report having financial information may be presented in a first currency in the first country and a second currency in the second country.

The report definition thus includes at least two aspects: a report design that provides information relative to the type of data desired to be shown in the report and a localization, which provides for differences in how the data might be presented in one location versus another. Localization is provided by creating one version of a report for every locale that is supported by the report. The localization accomplished by modifying the report definition language to create the different versions of the reports and store them in the data store. When changes are required in a particular report, the changes must be coded into every version of the report, making the changes potentially cumbersome and time consuming to make. In addition, localizers, who focus on localization and may not have developing experience, use the report definition to embed localizations into each version of the report definition.

The discussion above is merely provided for general background information and is not intended to be used as an aid in determining the scope of the claimed subject matter.

SUMMARY

In one illustrative embodiment, a method of developing a report capable of providing information from a local database in a predefined structure to a remote application is discussed. The method includes the step of defining an abstract data report structure configured to provide a report to the remote application having a plurality of data elements. The method further includes localizing at least one of the plurality of data elements by assigning a value to a remote data structure associated with the data element and exposing the abstract data report structure to the remote application.

In another embodiment, a method of providing a localized a report to a remote device is discussed. The method includes accessing an abstract data report structure configured to provide a definition of report of data from a database stored on a remote tangible computer readable medium. The method further includes associating stored data with the abstract data report structure and localizing the abstract data report structure by associating data from a localizing data structure with the abstract data report structure. The method also includes providing at least a portion of the associated stored data to the remote device.

In still another embodiment, a localizable database report structure configured to provide a localized report including data from a remote database is discussed. The report structure includes a plurality of data fields and at least one data label configured to accept a localization element. The report structure further includes a data structure having at least one data element associated with one of the plurality of data fields and a configurable data structure having a localization element configured to be associated with the at least one data label.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 illustrates a record of the type stored in a report data portion of a data store illustrated in FIG. 1 according to one illustrative embodiment.

FIGS. 7A-B illustrate records of the type stored in a metadata portion of the data store illustrated in FIG. 1 according to one illustrative embodiment.

DETAILED DESCRIPTION

Figure 1:
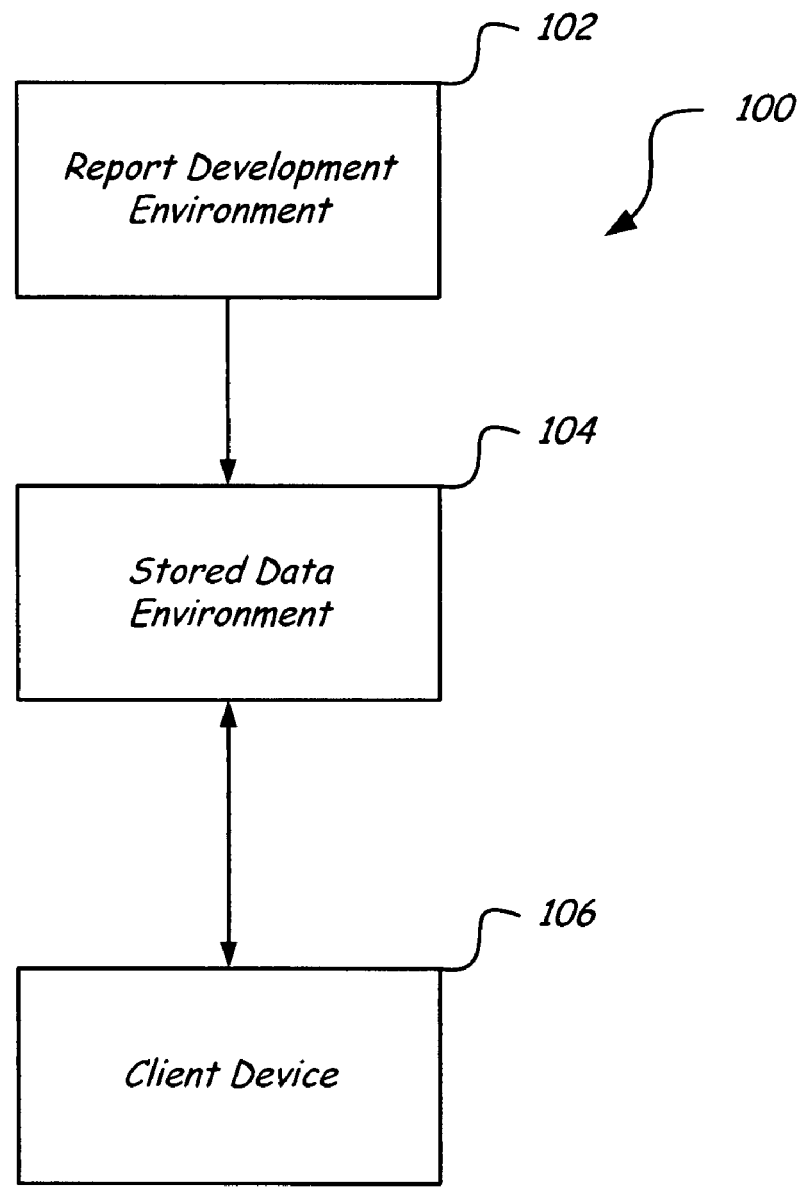
FIG. 1 is schematic block diagram of a system for developing and accessing report visualizations according to one illustrative embodiment.

FIG. 1 provides a diagram of a system 100 for creating and accessing reports or visualizations of stored data having localizations that are separated from other portions of the report definition according to one illustrative embodiment. System 100 includes a report development environment 102. Report development environment 102 provides an environment in which a report developer can create reports for use by a client device 106. In one illustrative embodiment, the report development environment 102 utilizes a visual environment such as Visual Studio or some other similar development platform. Report definitions created in the report development environment 102 illustratively include localizations that are separated from the other defined aspects of the report definition. The report definitions provide, in one illustrative embodiment, an automatic layout. That is, the report definitions provided to the client device include abstract metadata that can be automatically rendered at the client device 106. Alternatively, the report definitions include a precision layout that is provided to the client device 106 to provide a precise rendering of the report on the client device 106. Depending upon the particular requirements of a given report either of the automatic layout or the precision layout can be provided by the report development environment 102. Each of the automatic layout and the precision layout options will be discussed in more detail below.

The system 100 also includes a stored data environment 104, which stores the report layouts that are created in the report development environment 102. The stored data environment 104 includes at least one data store, which stores the report layouts. In addition, the stored data environment 104 is capable of communicating with the client device 106 to provide information related to a particular report in response to a request by the client device 106. The stored data environment 104 and the communication between the stored data environment 104 and the client device 106 will be discussed in more detail below.

Figure 2:
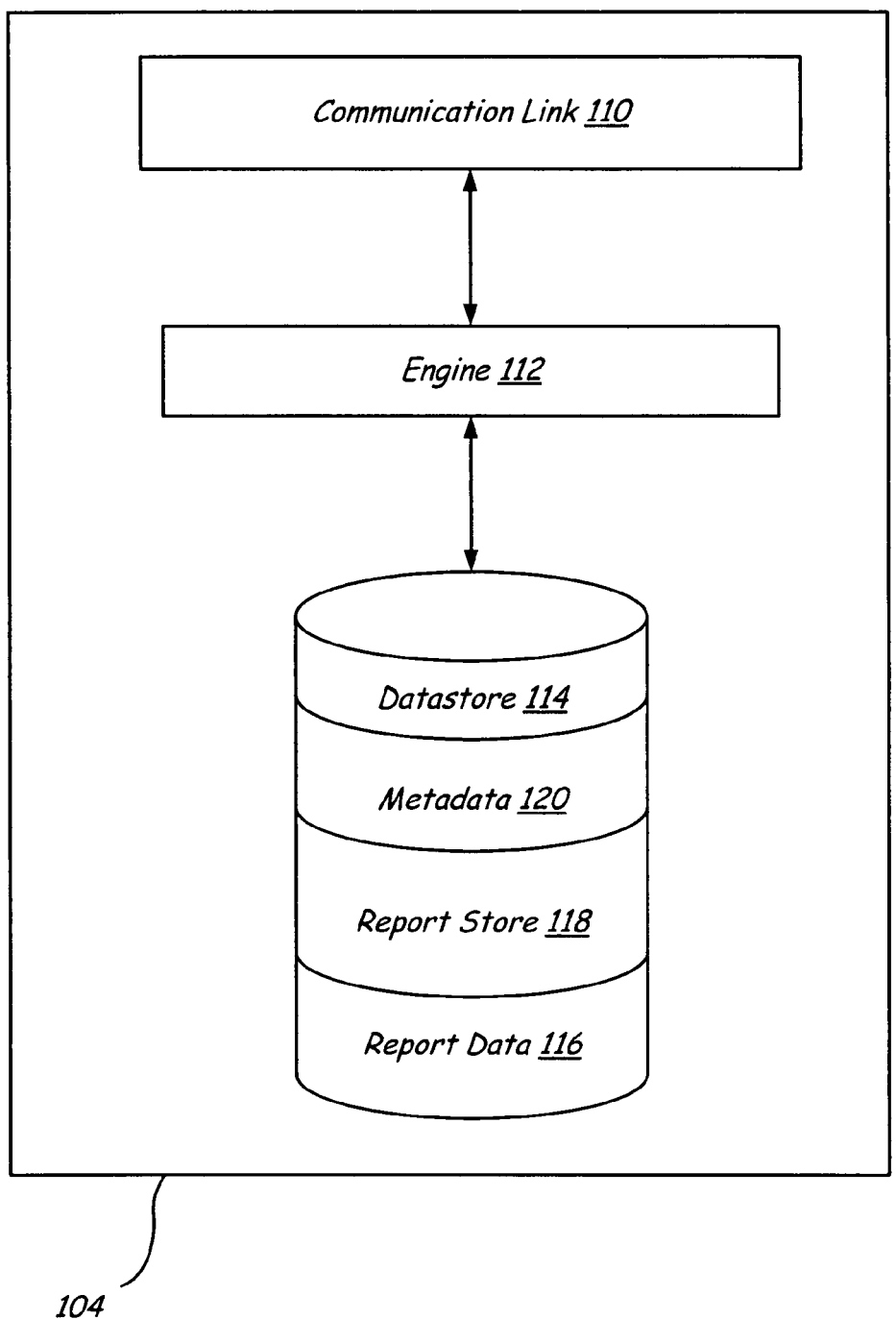
FIG. 2 is a schematic block diagram of a stored data environment of the type used in the system of FIG. 1 according to one illustrative embodiment.

FIG. 2 shows a schematic of an illustrative embodiment of the stored data environment 104 in more detail. The stored data environment 104 illustratively includes a communication link 110. The communication link 110 includes the appropriate components to facilitate communication information between the stored data environment 104 and the report development environment 102. The communication link 110 can illustratively take many different forms without departing from the scope of the invention. For example, in one illustrative embodiment, the stored data environment 104 is a server that communicates over a wide area network with the report development environment 102. Communication link 110 then provides the appropriate components to access the report development environment 102 over the wide area network. Alternatively, the report development environment 102 is accessible by the stored data environment 104 over a local area network. Alternatively still, the report development environment 102 is located on the same computing device as the stored data environment 104. Regardless of the particular implementation of stored data environment 104 and the report development environment 102, the communication link 110 provides an interface between the two environments.

In addition, the communication link 110 provides communication between the stored data environment 104 and the client device 106. In one illustrative embodiment, the client device 106 is intended to access the stored data environment 104 via a wide area network. The communication requirements between the stored data environment 104 and the report development environment 102 are, in some embodiments, different from those between the stored data environment 104 and the client device 106. In those embodiments, the communication link 110 has differing components to provide communication for the stored data environment 104.

The stored data environment 104 also illustratively includes an engine 112. Engine 112 engages the report development environment 102 and the client device 106 to communicate information through the communication link 110. In addition, the engine 112 engages a data store 114 to store and/or retrieve stored information. The engine 112 can be any suitable device that is capable of engaging the data store 114 and communicate via the communication link 110. Data store 114 can be implemented in any of a variety of ways, including a database such as a SQL database stored on a database server.

Data store 114 illustratively stores information related to reports as well as the stored data about which such reports are created. In one illustrative embodiment, the data store 114 includes a report data portion 116, which stores data about which reports are desirably created. The data stored in the report data portion 116 can be stored in any form, including tables having a plurality of fields to store information as required.

Data store 114 also illustratively includes a report store 118, which stores information related to a particular report that as been developed for the purposes of provided a visualization of data stored in the report data portion 116 of the data store 114. In one illustrative embodiment, the report store stores an abstract data report structure that defines a plurality of data elements. As discussed above, reports can be created in an automatic format or in a precise format. In an automatic format, the report store 118 includes information that relates to the type of information that is to be visualized, but does not provide a precise layout for the client device to use in its report. An example of such a report in one embodiment is a sales report. The sales report can illustrative include information about clients, including the name of the client, a business address, total sales to that client, and a time period of the report. While a report of this nature necessarily includes this type of information, it may not be especially important as to how that information is displayed on the client device 106. With the automated layout format, the client device can illustratively provide a visualization without precise layout provided by the information in the report store 118.

In the precise layout format, the report store 118 includes information relating not only to the type of information, but how the information is displayed on the client device. This is advantageous when the report is, for example, intended to be printed on a predefined report template. One example of a report that advantageously has a precise layout is a report that visualizes a check report.

Data store 114 also illustratively includes a metadata store 120. The metadata store 120 includes information related to a specific version of a particular report. A particular report may illustratively be viewed by persons who speak a variety of different languages. The report is thus advantageously provided in a local report language, that is, the language of choice for a particular viewer or the language of choice at a particular location. Therefore, certain pieces of information are necessarily provided translated into more than one language. Such translations are referred to as localizations. Localization information is illustratively stored in the meta data store 120.

Figure 3:
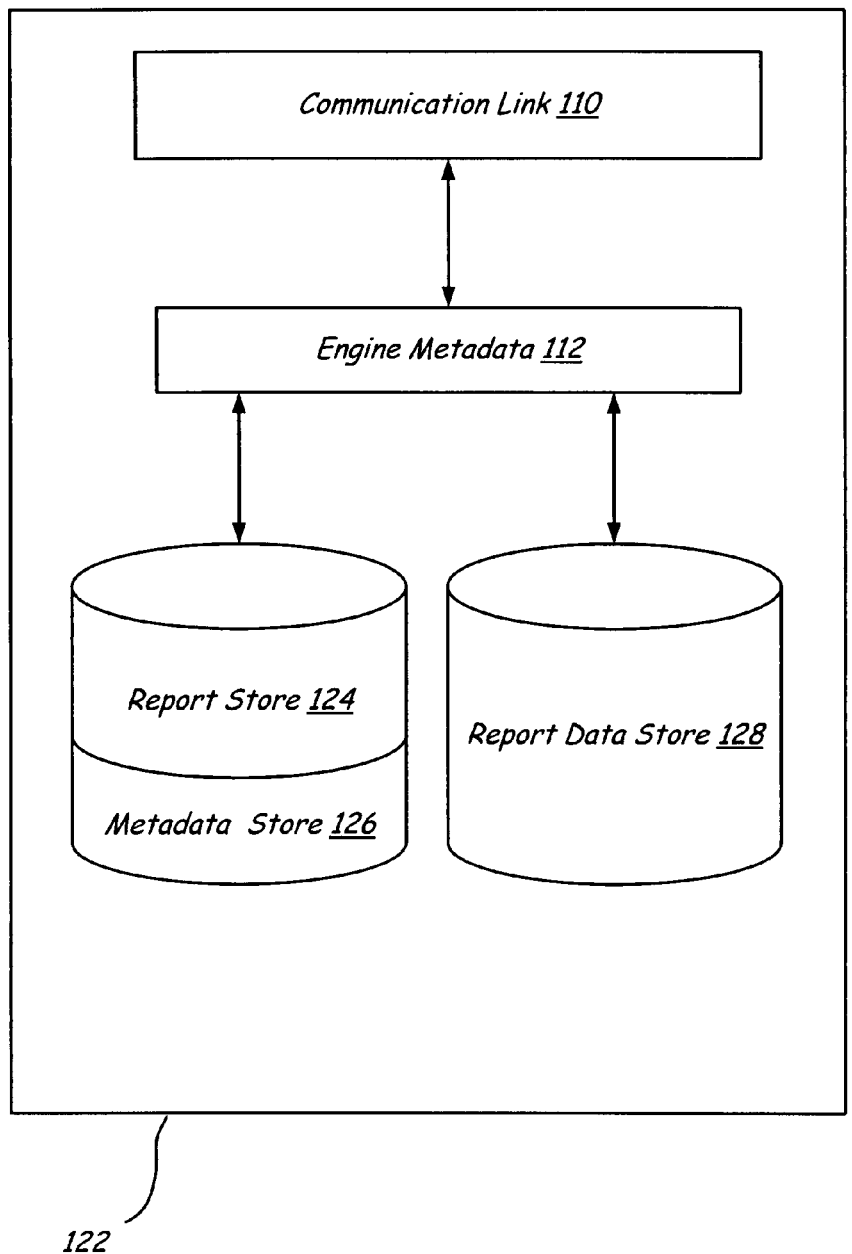
FIG. 3 is a schematic block diagram of an alternative stored data environment of the type used in the system of FIG. 1 according to another illustrative embodiment.

FIG. 3 illustrates an alternative stored data environment 122 according to one illustrative embodiment. Stored data environment 122 can be used in system 100 as an alternative to the stored data environment 104. Stored data environment 122 includes a pair of data stores, including a report data store 124. The report data store 124 illustratively includes information related to various reports. In addition, the report data store 124 includes a metadata store 126, which illustratively includes localizations for use with information related to given reports in the report data store 124. The report data store 122 also illustratively includes a report data store 128, which illustratively includes stored data that is accessible for use in a report. As with the stored data environment 104, the stored data environment 122 is configured to receive information from the report development environment 102 and provide information to the client device 106.

Figure 4:
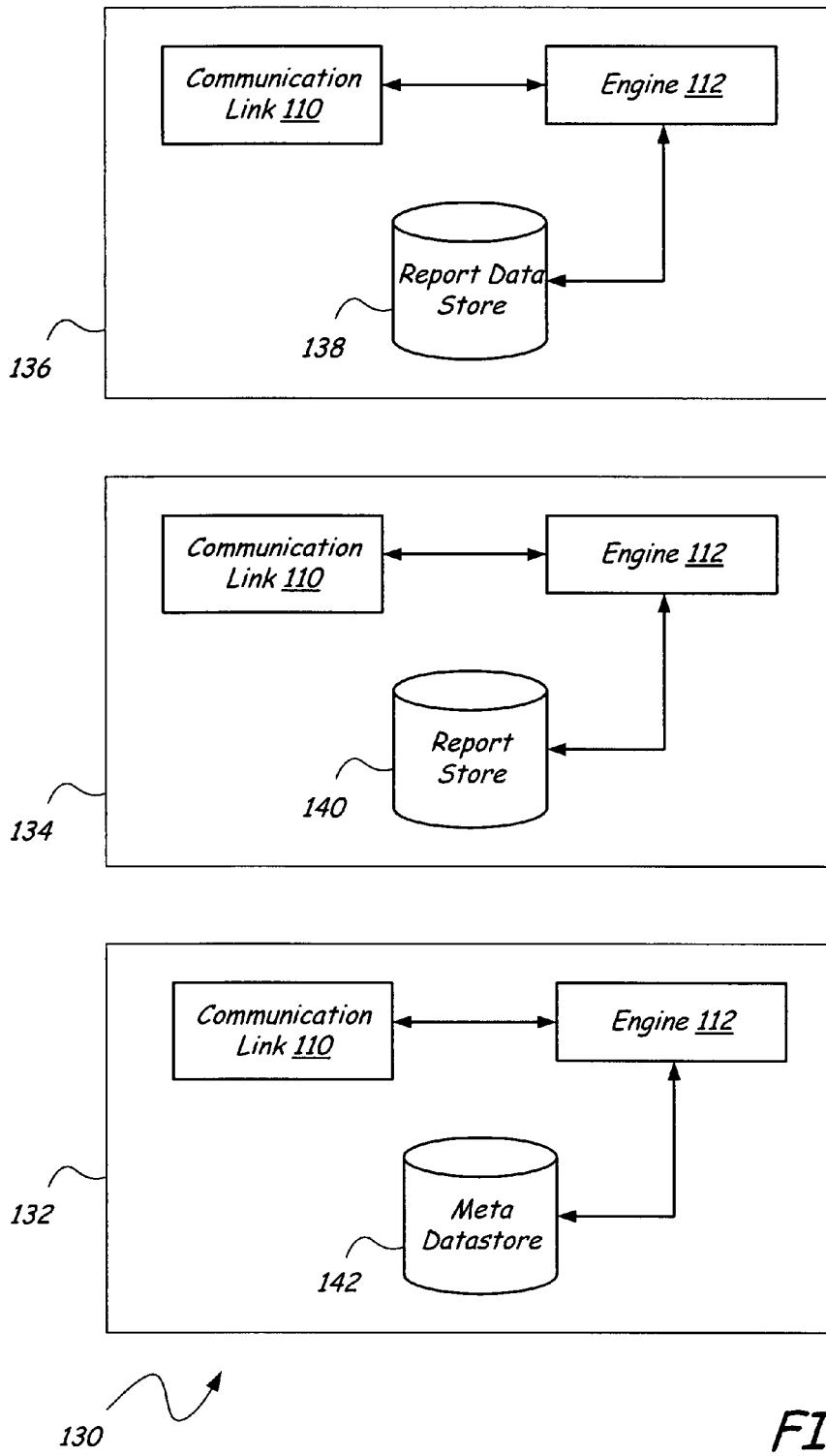
FIG. 4 is a schematic block diagram of yet another alternative stored data environment of the type used in the system of FIG. 1 according to one illustrative embodiment.

FIG. 4 illustrates another stored data environment 130 according to an illustrative embodiment. The stored data environment 130 includes a stored metadata environment 132, a stored report environment 134 and a stored report data environment 136. Each of the stored metadata environment 132, the stored report environment 134 and the stored report data environment 136 include a communication link 110 and an engine 112. The stored metadata environment 132 includes a metadata data store 142, which illustratively stores localizations related to reports that are stored in the report store 140 of the stored report environment 134. Report data is illustratively stored in the report data store 138 of the stored report data environment 136.

Each of the environments 132, 134, and 136 can be located, for example on a single server or other suitable device. Alternatively, each of the environments can be located on separate servers. It should be appreciated by the foregoing examples that any number of different arrangements can be employed to store data in a stored data environment without departing from the scope and spirit of the current discussion.

Figure 5A:
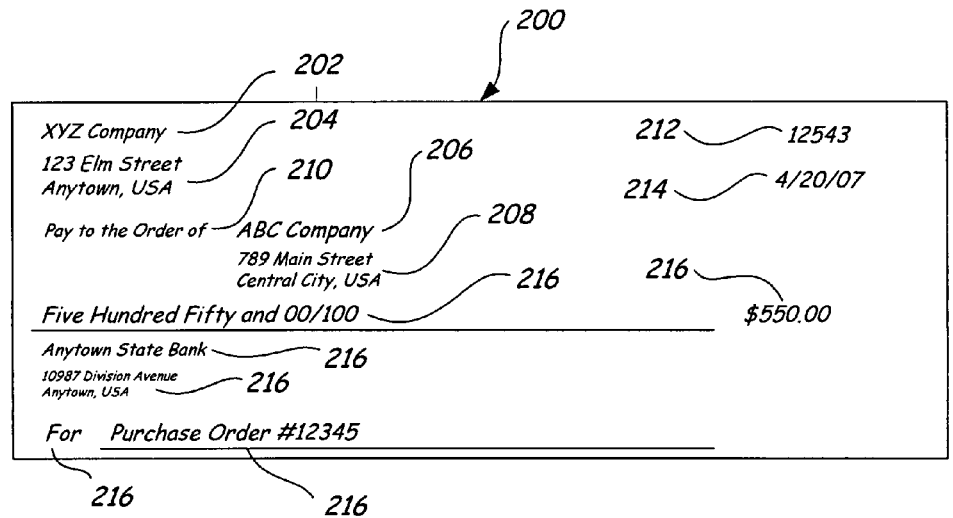
FIG. 5A illustrates a visualization of a check report according to one illustrative embodiment.
Figure 5B:
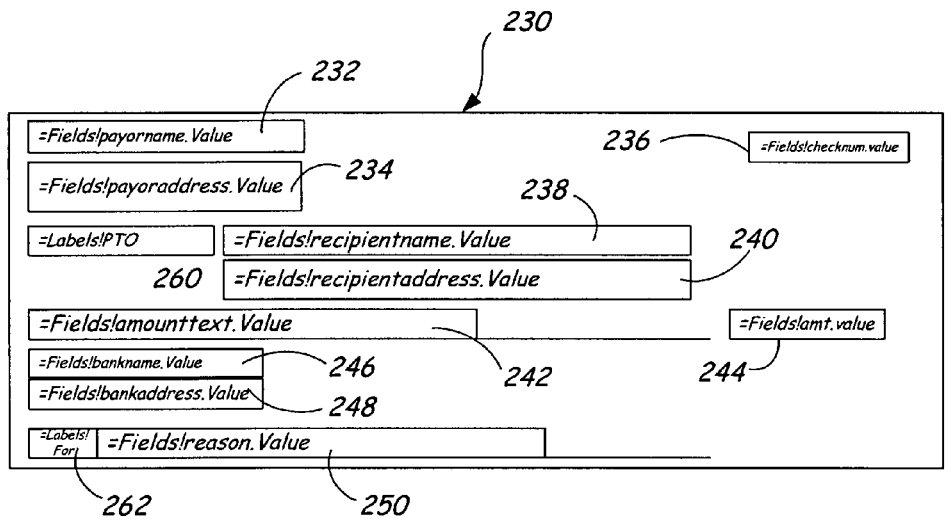
FIG. 5B illustrates a check report definition having a precise layout that can be advantageously used to create the check report of FIG. 5A.

FIGS. 5A-B illustrate a report 200 according to one illustrative embodiment. FIG. 5A illustrates report 200 in a completed form. Report 200 is, in one illustrative embodiment, a printed check. Report 200 includes a number of pieces of information. For example, the report 200 includes information about the payor, including the payor name 202 and the payor address 204. The report 200 includes information about the payee as well. For example, the payee's name 206 and address 208 is provided. In addition, a textual phrase 210 provides an indication that signals to whom the check is to be paid. One example of such a textual phrase 210 is illustrated in FIG. 5A as "Pay to the Order of".

The report 200 also includes a check number 212, the date 214, as a numerical value 216 and a textual value 218 that represent the amount of the check. Information about the bank upon which the check is drawn is also provided. The bank information includes the bank name 220 and the bank address 222. Additional information is provided relative to a textual indication of a reason 224 for the check is provided. A textual phrase 226 provides a data element that indicates the location the reason 224. The textual phrase 226 is illustratively "For".

FIG. 5B illustrates a report definition 230 created to provide the report 200 according to one illustrative embodiment. The report definition 230 is illustratively an abstract data report structure having a plurality of data elements, which will be described in more detail below. Note that the report definition 230 illustrated in FIG. 5B is a "precise layout". That is, the report definition 230 provides the precise structure for the display of the report 200 on a client device 106. The report definition illustratively provides at least two different types of abstract data elements or markers: fields and labels. In the illustrative embodiment, a field is a data element that is associated with information stored in a data store such as report data store 116 of FIG. 2. Field data is illustratively consistent regardless of the particular location at which the given report is visualized. That is, there are illustratively no localizations associated with the field data elements.

The fields in the report definition 230 include a Fields!payorname.Value field 232 and a Fields!payoraddress.Value field 234, which illustratively provide data elements for the name and address of the payor, respectively. The report definition 230 also illustratively provides a Fields!checknum.value field 236, which provides a data element configured to represent the check number. The Fields!recipientname.Value 238 and Fields!recipientaddress.Value 240 provide data elements for the name and address, respectively, of the recipient of the check. Fields!amounttext.value 242 and Fields!amt.value 244 provide data elements for the textual and numerical representations of the amount of the check. Fields!bankname.value 246 and Fields!bankaddress.value 248 provide data elements for the bank name and address, respectively. Fields!reason.value 250 provides a data element for the reason for the check.

As is mentioned above, the report definition 230 illustratively includes data elements that are labels as well as fields. Labels are created when it is desirable to provide a dynamic data element. In other words, the labels are data elements that can be remotely modified to accomplish localizations. Labels!PTO 260 provides an abstract data element for the text phrase that indicates to whom or what entity the check is written. Labels!For provides an abstract data element that indicates the location of the reason for writing the check.

The report definition 230 illustrated in FIG. 5B is, in one illustrative embodiment, stored in the report store 118 of the data store 114 illustrated in FIG. 2. As discussed above, the report definition 230 is illustratively a precise definition. Therefore, the information stored in report store 118 includes not only the names of the fields and labels described above, but also the size and position of the data elements defined in the report definition 230. Alternatively, the report definition 230 is an automated layout and as such does not necessarily include information related to the size and position of data elements as defined in the report definition 230.

The data for the field data elements is illustratively stored in the report data portion 116. The report data portion 116 illustratively includes one or more records having a plurality of fields. FIG. 6 illustrates a record 300 having fields associated with the report definition 230 according to one illustrative embodiment. The record 300 is capable of being associated with the fields in record definition 230 to create the report 200. Record 300 is shown having the same number of fields as are defined in the report definition 230. Alternatively, the record 300 can have any number of additional fields. FIGS. 7A-B illustrate records 310 and 312 including a pair of fields that are associated with the labels in the record definition 230. Thus, depending upon the particular record that is associated with the labels in the report definition, the check report is produced in a particular language. For example, record 310 has fields using the English Language. Associating record 310 with the labels in the report definition 230 thus results in a check report that includes labels in English. As another example, record 312 has fields translated into French. Associating record 312 with the labels in the report definition 230 thus results in a check report that includes labels in French.

Figure 8:
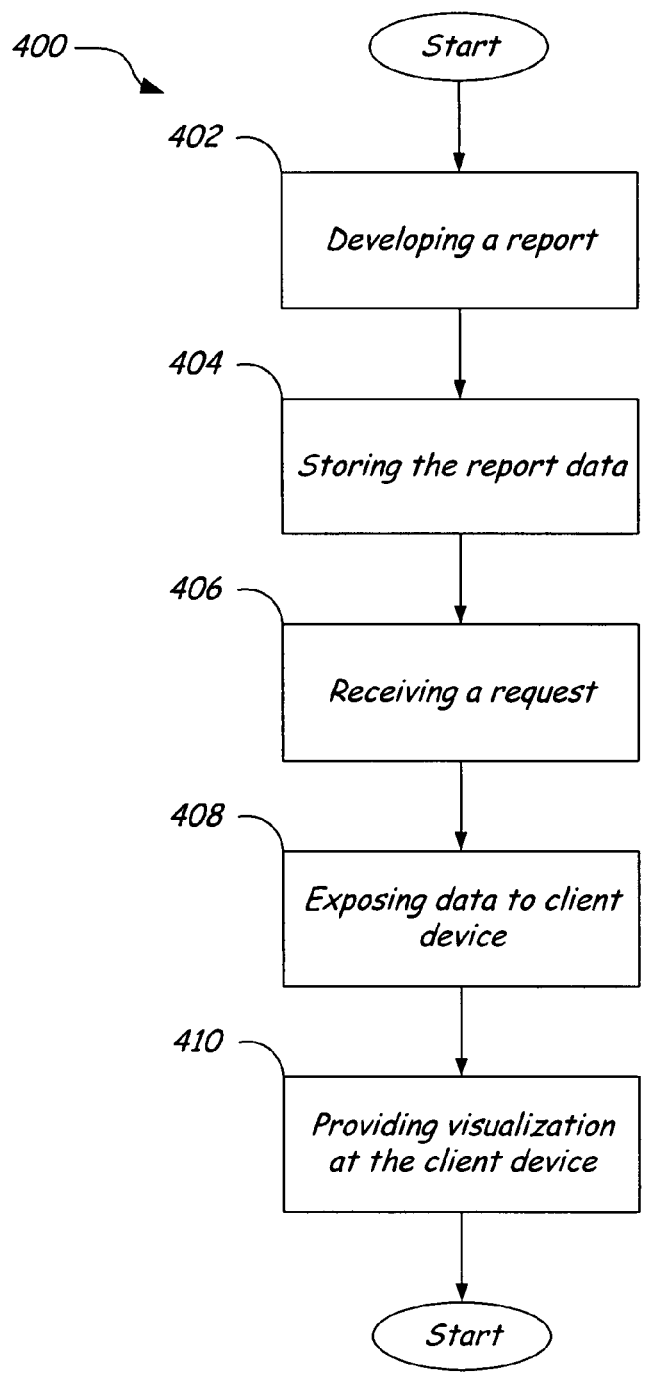
FIG. 8 illustrates a method of creating and using a report according to one illustrative embodiment

FIG. 8 illustrates a method 400 of creating and using a report according to one illustrative embodiment. Block 402 illustrates the step of developing a report. In one illustrative embodiment, the step of developing a report includes developing an abstract data structure such as the report definition 230. Creating a report definition 230 is illustratively accomplished by accessing the report development environment 102. The report development environment, as discussed above is illustratively a visual programming environment. The report development environment 102 includes the ability to add fields and labels to a report. As discussed above, the report can be defined as a precise layout or an automated layout.

The step 402 of developing a report, in one embodiment, further includes providing localizations for labels that have been created in the report definition 230. This is illustrative accomplished by creating a data structure and providing data to the structure such that the structure is associated with the report definition 230. The types of data can be provided to such a localization data structure include, as discussed above, information related to linguistic translations of textual information provided to labels. Alternatively, any other type of information can be provided through localization, depending upon the definition a particular label. For example, the label can be defined to accept localizations related to font size, font type, right to left orientation, and the like.

During the step of creating the report definition and associated localizations, a developer can utilize a preview pane to view a report during the development process. In one illustrative embodiment, the preview pane provides a view of the report in one of the given languages. The report 200, shown in FIG. 6 is representative of a preview pane illustrating the report definition 230 when it is localized in English. By showing the report definition 230 in any of the languages in which the report is localized, the developer is capable of seeing the report as it would be shown in any language. Such a preview can provide information determining whether the report definition should be modified to accommodate for any issues that may arise.

Once the report has been created, it is stored in the stored data environment as is represented in block 404. In one illustrative embodiment, the report definition 230 is stored such that it is independently stored from the localizations, which are stored in a metadata store.

In block 406, the stored data environment 104 receives a request for a report from the client device 106. In one illustrative embodiment, the request is provided to a communication link 110 located within the stored data environment at the time that the report is requested. Alternatively, the request can be provided at any time prior to the point at which the client device 106 desires to receive a report. For example, the client device 106 can schedule one or more occurrences of a report to occur at some point in the future. Alternatively, the client device 106 can request that the report be sent to any number of client devices in a batch mode. Alternatively still, requests can be received from other sources, such as from the report development environment 102.

Once the request has been received, the stored data environment exposes the report to the client device 106, as illustrated by block 408. In one embodiment, the report definition 230 is exposed to the client device 106. In addition, the report data and metadata stored in the stored data environment 104 is exposed to the client device. The client device 106 can then access the exposed information from the stored data environment 104. In one illustrative embodiment, when the report/definition is an automated definition, the individual data structures itemized above are all exposed to and accessed by the client device.

Alternatively, in response to a request, the stored data environment will generate a report by accessing the report definition, report data, and the proper localization. The report is then exposed to and accessed by the client device 106. This is illustratively performed in the case where the report definition is a precise layout.

Once the report data is accessed by the client device 106, the client device then provides a visualization of the report on the client device 106, as is shown in block 410. In one embodiment, the client device 106 generates the report by associating the report definition 230, the report data, and metadata. Alternatively, when the report has been previously generated and exposed to the client device 106, the client device merely presents the previously generated visualization.

The embodiments discussed above provide important advantages. Report developers will be able to create one report definition that can then be localized by providing labels in a metadata data store. This allows a given report to be localized in multiple locations, including locations that speak different languages, without having to create a separate definition for each locale. This allows for localization to be achieved without having to provide a separate report definition for each location at which a report may be visualized. In addition, by defining reports using abstracted metadata or localization, localizers can create localizations of a given report without having to understand the report definition language. In addition, localizers can provide support for a new locale without requiring modification of the report definition.

Another advantage of the embodiments discussed above is the ability to preview reports in multiple languages in the report development environment. This allows the developer to make any changes necessary to the report definition easily by viewing any defined localizations and making adjustments as necessary. The developer can then deploy localized reports to the stored data environments. Furthermore, because localization information is created separately from report definition information, modification of either of the localization and the report definition can be achieved without necessarily requiring a modification of the other, resulting in reduced complexity in the generation of reports and of localizations of those reports.

Figure 9:
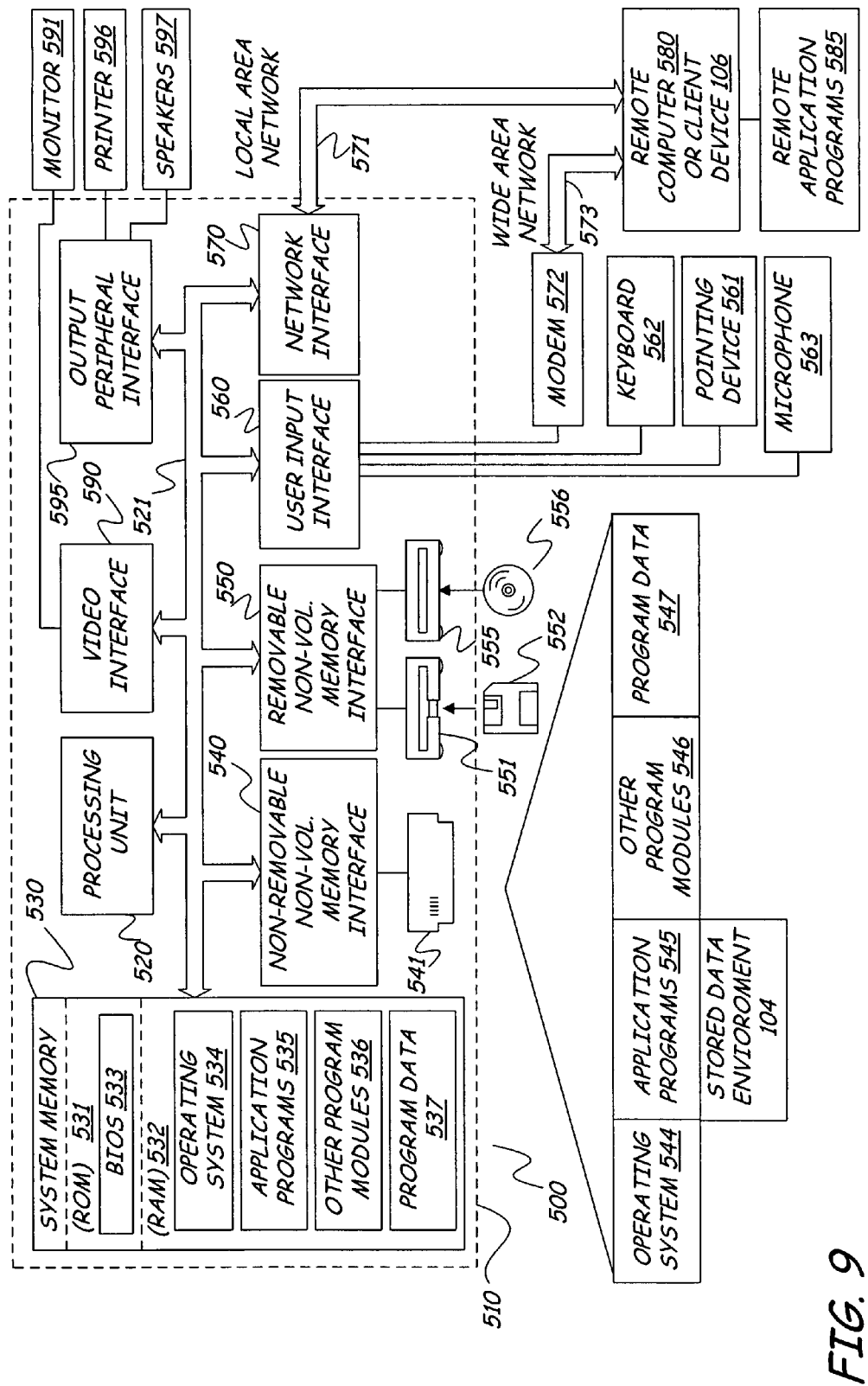
FIG. 9 is a block diagram of one computing environment in which some embodiments may be practiced.

FIG. 9 illustrates an example of a suitable computing system environment 500 on which embodiments may be implemented. The computing system environment 500 is only one example of a suitable computing environment and is not intended to suggest any limitation as to the scope of use or functionality of the claimed subject matter. Neither should the computing environment 500 be interpreted as having any dependency or requirement relating to any one or combination of components illustrated in the exemplary operating environment 500.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that perform particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 9, an exemplary system for implementing some embodiments includes a general-purpose computing device in the form of a computer 510. Components of computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 510 typically includes a variety of computer readable media. Computer readable media can be any available media that can be accessed by computer 510 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 510. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 9 illustrates operating system 534, application programs 535, other program modules 536, and program data 537.

The computer 510 may also include other removable/non-removable volatile/nonvolatile computer storage media. By way of example only, FIG. 9 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550. Any of these nonvolatile storage media can illustratively be used to store the data associated with the stored data environment 104.

The drives and their associated computer storage media discussed above and illustrated in FIG. 9, provide storage of computer readable instructions, data structures, program modules and other data for the computer 510. In FIG. 9, for example, hard disk drive 541 is illustrated as storing operating system 544, application programs 545, other program modules 546, and program data 547. Note that these components can either be the same as or different from operating system 534, application programs 535, other program modules 536, and program data 537. Operating system 544, application programs 545, other program modules 546, and program data 547 are given different numbers here to illustrate that, at a minimum, they are different copies.

A user may enter commands and information into the computer 510 through input devices such as a keyboard 562, a microphone 563, and a pointing device 561, such as a mouse, trackball or touch pad. Other input devices (not shown) may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. In addition to the monitor, computers may also include other peripheral output devices such as speakers 597 and printer 596, which may be connected through an output peripheral interface 595.

The computer 510 is operated in a networked environment using logical connections to one or more remote computers, such as a remote computer 580. The remote computer 580 may be a personal computer, a hand-held device, a server, a router, a network PC, a peer device or other common network node, and typically includes many or all of the elements described above relative to the computer 510. The client device 106 is in some illustrative embodiments a computer such as the remote computer 580. The logical connections depicted in FIG. 9 include a local area network (LAN) 571 and a wide area network (WAN) 573, but may also include other networks. Such networking environments are commonplace in offices, enterprise-wide computer networks, intranets and the Internet. Any of these logical connections can be used to access the stored data environment 104.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560, or other appropriate mechanism. In a networked environment, program modules depicted relative to the computer 510, or portions thereof, may be stored in the remote memory storage device. By way of example, and not limitation, FIG. 9 illustrates remote application programs 585 as residing on remote computer 580. It will be appreciated that the network connections shown are exemplary and other means of establishing a communications link between the computers may be used.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer implemented method of developing a report providing information from a local database stored in a tangible medium, in a predefined structure, to a remote application, using a computer with a processor, comprising:

defining, with the processor, an abstract report definition structure representing a report comprising a check payable from a payor to a payee in an amount, the report definition structure having a plurality of data elements that are represented in the report structure in a given way regardless of what natural language and what currency are used in the remote application;

localizing at least one of the plurality of data elements by assigning, with the processor, a value to the at least one data element, the value associating the at least one data element with a localized data record, stored separately from the report definition structure, and including localized data reported in the at least one data element, wherein the localized data comprises currency information indicative of the amount of the check, the currency information indicating conversion of a currency from a source currency, corresponding to the amount of the check, to a local currency used in the remote application;

assigning, with the processor, values to other data elements in the report definition structure, other than the at least one data element, the values associating the other data elements with data records that are localization-independent, and that are stored separately from the localized data record;

exposing the abstract report definition structure and associated data records and localized data record to the remote application;

displaying, in a preview pane, the check to be generated by the remote application at a first locale, using the local currency for the first locale to show the amount; and displaying, in the preview pane, the check to be generated by the remote application at a second locale, using the local currency for the second locale to show the amount, the local currency for the second locale being different from the local currency for the first locale.

2. The method of claim 1 and further comprising:
amending the abstract report definition structure;
exposing the amended abstract report definition structure to the local application; and
wherein amending the abstract data report structure is accomplished without requiring additional localizing of at least one of the plurality of data elements.

3. The method of claim 1 wherein localizing at least one of the plurality of data elements is performed at the remote application.

4. The method of claim 1, wherein localizing the at least one of the plurality of data elements includes assigning the value to the at least one data element by assigning metadata corresponding to the at least one data element.

5. The method of claim 4, wherein assigning metadata includes providing information related to a right to left layout.

6. The method of claim 4, wherein assigning metadata includes providing information related to a local report language.

7. The method of claim 4, wherein assigning metadata includes providing information related to a font.

8. The method of claim 1, wherein exposing the abstract report definition structure includes exposing default localized metadata.

9. The method of claim 1, wherein defining an abstract report definition structure includes defining the at least one of the plurality of data elements as a configurable label and wherein localizing at least one of the plurality of data elements includes associating data to the configurable label outside of the abstract report definition structure.

10. A method of providing a localized report at a device, the localized report being localized to a particular locale, the method comprising:

accessing, with a computer processor on the device, a data report structure providing a definition of a check payable to a payee by a payor in an amount, the payee, payor and amount being data from a database stored on a tangible computer readable medium, and including a plurality of data elements, the data report structure that is remote from the device associating stored report data with data elements in the data report structure, the data element identifying labels to be localized by the remote device, the labels including currency representing the amount of the check;

localizing, with the computer processor on the device, the data report structure by associating localized data from a localizing data structure with the labels in the data report structure, which are represented in the data report structure in a localization-independent way, the localized data including a currency value for the amount of the check converted from a source currency to a local currency associated with the particular locale of the device; and displaying the check with localized labels, at the device.

11. The method of claim 10, wherein localizing the data report structure includes providing localized information relative to language in the labels.

12. The method of claim 10, wherein localizing the data report structure includes providing localized information relative to display characteristics of the labels.

13. The method of claim 10, wherein accessing the data report structure comprises exposing at least a portion of the data report structure in response to a request from the device.

14. The method of claim 13 wherein exposing at least a portion of the data report structure includes exposing to a plurality of remote devices.

15. A development system generating a localizable database report structure and storing it on a tangible medium and providing a localized report including data from a remote database that is localized to a given locale, the development system comprising:

a visual development system receiving user inputs to define a business report definition that includes:
 a plurality of data fields;
 plurality of data labels that accept a localization element, a first of the data labels accepting a currency value and a second of the data labels accepting a textual value;
 a data structure having at least one data element associated with one of the plurality of data fields; and
 a configurable data structure having a localization element associated with each of the data labels; and a preview pane that displays a first report and a second report, the first report corresponding to localization of the report definition to a first locale and the second report corresponding to the localization of the report definition to a second locale, different from the first locale, the first report having first currency displayed in the first data label of the report definition, and the second report having a second currency, different from the first currency, displayed in the first data label of the report definition, the first currency being localized to the first locale and the second currency being localized to the second locale.

* * * * *